United States Patent [19]
Perrin

[11] Patent Number: 5,714,020
[45] Date of Patent: Feb. 3, 1998

[54] PROCESS FOR HEAT TREATMENT OF A STEEL RAIL

[75] Inventor: Jean Luc Perrin, Bertrange, France

[73] Assignee: Sogerail, Hayange, France

[21] Appl. No.: 718,198

[22] Filed: Sep. 20, 1996

[30] Foreign Application Priority Data

Sep. 20, 1995 [FR] France ................................ 95 10986

[51] Int. Cl.[6] ................................ C21D 9/04
[52] U.S. Cl. ................................ 148/581
[58] Field of Search ................................ 148/581

[56] References Cited

U.S. PATENT DOCUMENTS 5,004,510  4/1991  Yu et al. .

FOREIGN PATENT DOCUMENTS

| 1 237 558 | 6/1960 | France . |
| 2 109 121 | 5/1972 | France . |
| 2 479 265 | 10/1981 | France . |
| 2 194 557 | 3/1988 | United Kingdom . |

*Primary Examiner*—Deborah Yee
*Attorney, Agent, or Firm*—Oblon, Spivak, McClelland, Maier & Neustadt, P.C.

[57] ABSTRACT

A process for the heat treatment of a steel rail having a head, a web and a flange. The rail is preheated, overheated and cooled. The process applies to steel in general, as well.

13 Claims, 2 Drawing Sheets

PROCESS FOR HEAT TREATMENT OF A STEEL RAIL

BACKGROUND OF THE INVENTION

1. Field of the Invention

The present invention relates to the manufacture of a railroad rail made of high-carbon or low-alloy steel.

2. Background of the Invention

A railroad rail is a long rolled-steel product which is profiled to have a head on which the wheels of the trains roll, a flange intended to fix the rail onto the ground via sleepers, and a web which joins the head to the flange. The head should be very hard in order to withstand the wear generated by the contact with the wheels; the web and the flange should have sufficient mechanical strength to ensure proper support of the head; the assembly should be straight, at least before the track is laid, in order to ensure a good running quality. The rail is generally subject to residual internal stresses, the distribution of which is of great importance for safety in terms of brittle fracture. There are several grades of rails, which are distinguished in particular by the surface hardness of the head and by the mechanical characteristics of the web and flange and by the distribution of the residual internal stresses. These various qualities are tailored to the production of tracks intended to carry trains of varying weight and of varying speed.

In order to manufacture a rail intended to carry heavy or fast trains, use is made of a high-carbon, optionally low-alloy, eutectoid steel whose chemical composition comprises, by weight, as defined in International Union of Railroads standard 860-0, up to 0.82% of carbon, up to 1.70% of manganese, up to 0.9% of silicon, up to 1.3% of chromium, optionally grain-refining elements, the remainder being iron and impurities resulting from production. The rail is obtained by rolling a semi-finished product, followed by a partial or full heat treatment and, optionally, by straightening. The heat treatment is intended to give at least the head a very hard fine pearlitic structure.

According to a first technique, after rolling and cooling, the head is partially austenitized by heating to approximately 900° C. and then cooled by blowing air or spraying water. This technique has the twofold drawback of creating weak zones in the zones heated between the transformation points $Ac_1$ and $Ac_3$, and above all causing very great deformation of the rail, this requiring straightening which generates residual stresses which are highly unfavourable in terms of the service performance of the rail.

In order to overcome these drawbacks, it has been proposed, in particular in French Patent Application No. 2 603 306, to supplement the heat treatment of the head by a simultaneous partial heat treatment of the flange, so that the deformations generated by the heat treatment of the flange will balance the deformations generated by the heat treatment of the head. It is then no longer necessary to straighten the rail. However, in this technique, the web is not treated and the junction zones between the web and the head, on the one hand, and the web and the flange, on the other hand, are embrittled because they are necessarily heated between the transformation points $Ac_1$ and $Ac_3$, which softens the metal.

According to another technique, described in particular in French Patent No. 2,109,121, the rail is treated throughout its thickness to obtain a very hard fine pearlitic structure by accelerated cooling either after homogeneous austenitization by delayed heating, or directly in the heat used in the rolling process. The rail thus obtained has a homogeneous structure and does not have weak zones in the web or at the junction between the web and the head or the flange. However, it has been observed during the application of this technique that the rail is deformed by the heat treatment, even though this is homogeneous and therefore, a priori, balanced, and it is necessary to perform straightening. This straightening generates residual stresses which weaken the web of the rail.

The residual stresses generated by excessive straightening weaken the web of the rail by promoting the propagation of longitudinal cracks, because these stresses tend to open these cracks. In order to evaluate the sensitivity of the web of the rail to crack propagation, a test is carried out which consists in making a notch at one end of the rail using a saw cut and in measuring the separation of the edges of the notch. When the separation of the edges of the notch is greater than the thickness of the saw cut, the residual stresses tend to facilitate the propagation of cracks, otherwise the residual stresses oppose the propagation and even initiation of cracks.

The object of the present invention is to overcome these drawbacks, by proposing a process for the manufacture of a rail made of eutectoid carbon or low-alloy steel, which leads to a fine pearlitic structure throughout the section of the rail and a residual stress distribution which tends to oppose the propagation of longitudinal cracks in the web of the rail.

SUMMARY OF THE INVENTION

To this end, the subject of the invention is a process for heat treatment of steel in general and preferably a steel rail, particularly the type comprising a head, a web and a flange, wherein:

each cross-section of the rail is preheated, successively or simultaneously, above the temperature of the end of the metallurgical heating transformation of the steel of which the rail is made, so that, simultaneously or successively, the steel in each cross-section of the rail uniformly has a homogeneous austenitic structure, that part of each cross-section of the rail which corresponds to the head is overheated, successively or simultaneously, so that the average temperature of said part of each cross-section of the rail is greater by at least 40° C. than the average temperature of that part of the same cross-section of the rail which corresponds to the flange, without ever exceeding 1050° C., and preferably 1000° C., each cross-section of the rail is cooled, successively or simultaneously, below the temperature of the end of the cooling transformation, so as to obtain a fine pearlitic structure throughout the cross-section of the rail, and each cross-section of the rail is optionally allowed to cool, simultaneously or successively, to ambient temperature.

Preferably, at the end of preheating, the temperature is greater than $Ac_3+100°$ C. at each point in each cross-section of the rail, $Ac_3$ being the slow-rate heating transformation temperature of the steel of which the rail is made. Any heating means capable of providing such preheating may be used herein.

At the end of additional heating (overheating), the average temperature of that part of each cross-section of the rail which corresponds to the head may be greater by at least 80° C. than the average temperature of that part of the same cross-section which corresponds to the flange. Any heating means capable of providing such overheating may be used herein.

It is preferable for the preheating of each cross-section of the rail to last at least 4 minutes. The preheating may include an alternate succession of partial and homogenization preheatings, so as to obtain, at the end of preheating, the most homogeneous possible temperature distribution in each cross-section of the rail.

It is preferable that, during cooling, the skin cooling rate of the rail on passing to the temperature of 700° C. is less than 10° C./s, and, optionally, that the skin cooling rate of the web and of the flange of the rail on passing to the temperature of 700° C. is less than 5° C./s. Any cooling means capable of such cooling of the rail may be used.

At the end of cooling, the skin temperature of the head of the rail is preferably less than or equal to 400° C.

The heat treatment of the rail may be carried out continuously by passing the rail successively through a preheating means, an overheating means and a cooling means.

The preheating means may be an induction heating means operating at a frequency greater than or equal to 2000 hertz, and it may include a plurality of heating zones separated by equalization zones.

The overheating means may be an induction heating means operating preferably at a frequency greater than or equal to 1000 hertz.

The cooling means may consist of at least two, and preferably a plurality of, pipes parallel to the rail, which are equipped with a plurality of nozzles capable of blowing air or a mist, it being possible for the nozzles to be controlled independently of one another or in groups.

BRIEF DESCRIPTION OF THE DRAWINGS

The invention will now be described in more detail, but without any limitation, with reference to the appended figures, in which.

DESCRIPTION OF THE PREFERRED EMBODIMENTS

Figure 1:
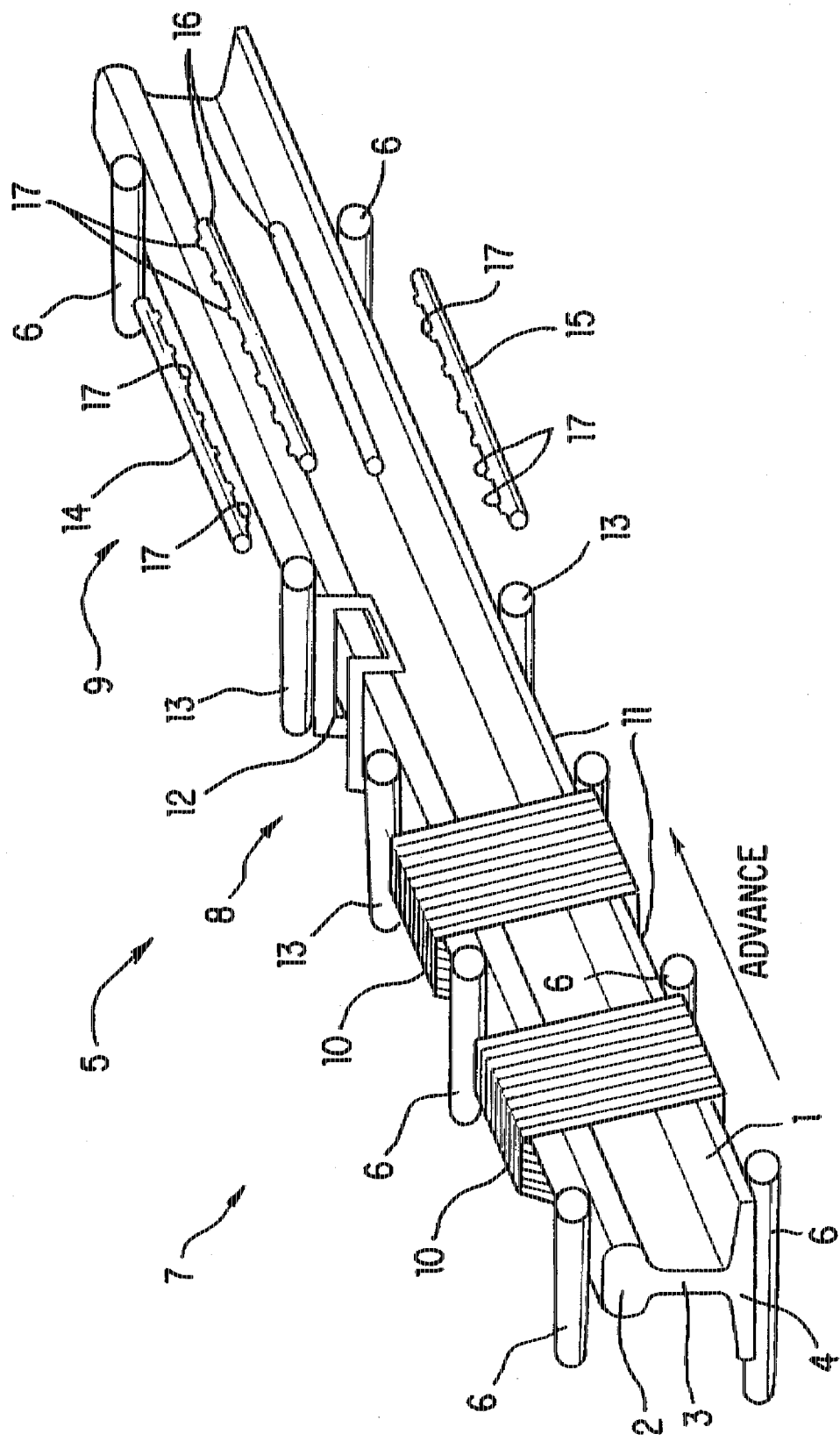
FIG. 1 represents, in perspective, a rail moving through a heat treatment installation.

The rail 1, obtained by hot rolling of an eutectoid carbon or low-alloy semi-finished steel product whose chemical composition comprises, by weight, as defined in International Railroad Union standard 860-0, up to 0.82% of carbon, up to 1.70% of manganese, up to 0.9% of silicon, up to 1.3% of chromium, optionally grain-refining elements, the remainder being iron and impurities resulting from production, includes a head 2, a web 3 and a flange 4. After rolling, the rail 1 is cooled to ambient temperature then heat-treated to give it its final working properties. The heat treatment is carried out, for example, by passing the rail through a continuous heat treatment installation of the type of the continuous heat treatment installation 5 represented in FIG. 1. The purpose of this heat treatment is to give the rail a very hard fine pearlitic structure, mainly in the head but also through the thickness of the rail. It has the further purpose of generating in the rail residual stresses which oppose the propagation of longitudinal cracks in the web.

The heat treatment installation 5 includes, in particular at the entry and at the outlet, guide rollers 6, and, arranged successively and in this order, a means 7 for preheating the entire section of the rail 1, a means 8 for complementary heating (overheating) of the head 2, and a means 9 for accelerated cooling of the entire section of the rail 1.

The preheating means 7 may be at least one induction heating coil 10 supplied with alternating electric current of frequency preferably greater than or equal to 2000 hertz, followed by a free space 11. The heating means thus may include an alternate succession of heating zones, corresponding to the coils 10, and equalization zones, corresponding to the free spaces 11. The coils are connected to electrical supply means which are known per se and are not represented; a stream of cooling water may pass through them according to methods known in the art.

The complementary (overheating) heating means 8 may be a U-shaped inductor 12 extending longitudinally above the rail and supplied, in a manner known per se, with alternating electric current whose frequency is preferably greater than or equal to 1000 hertz. The inductor 12 may be followed and preceded by guide rollers 13.

The accelerated cooling means 9 may be at least one upper pipe 14, extending longitudinally above the transit line of the head of the rail, and a lower pipe 15, extending longitudinally below the transit line of the flange of the rail, and, preferably, a plurality of pipes 16 extending longitudinally on either side of the transit line of the web of the rail. Each pipe 14, 15, 16 is equipped with a plurality of nozzles 17 which can blow air or a mist. The nozzles may be controlled independently of one another or in groups, so as to make it possible to modulate independently the strength and duration of the cooling on the head, web and flange.

In order to carry out the heat treatment of the rail 1, the rail is moved through the heat treatment installation 5 in the direction of the arrow in FIG. 1 so that each cross-section of the rail, which includes a part relating to the head, a part relating to the web and a part relating to the flange, passes successively through the preheating means 7, complementary (overheating) heating means 8 and the accelerated cooling means 9.

Figure 2:
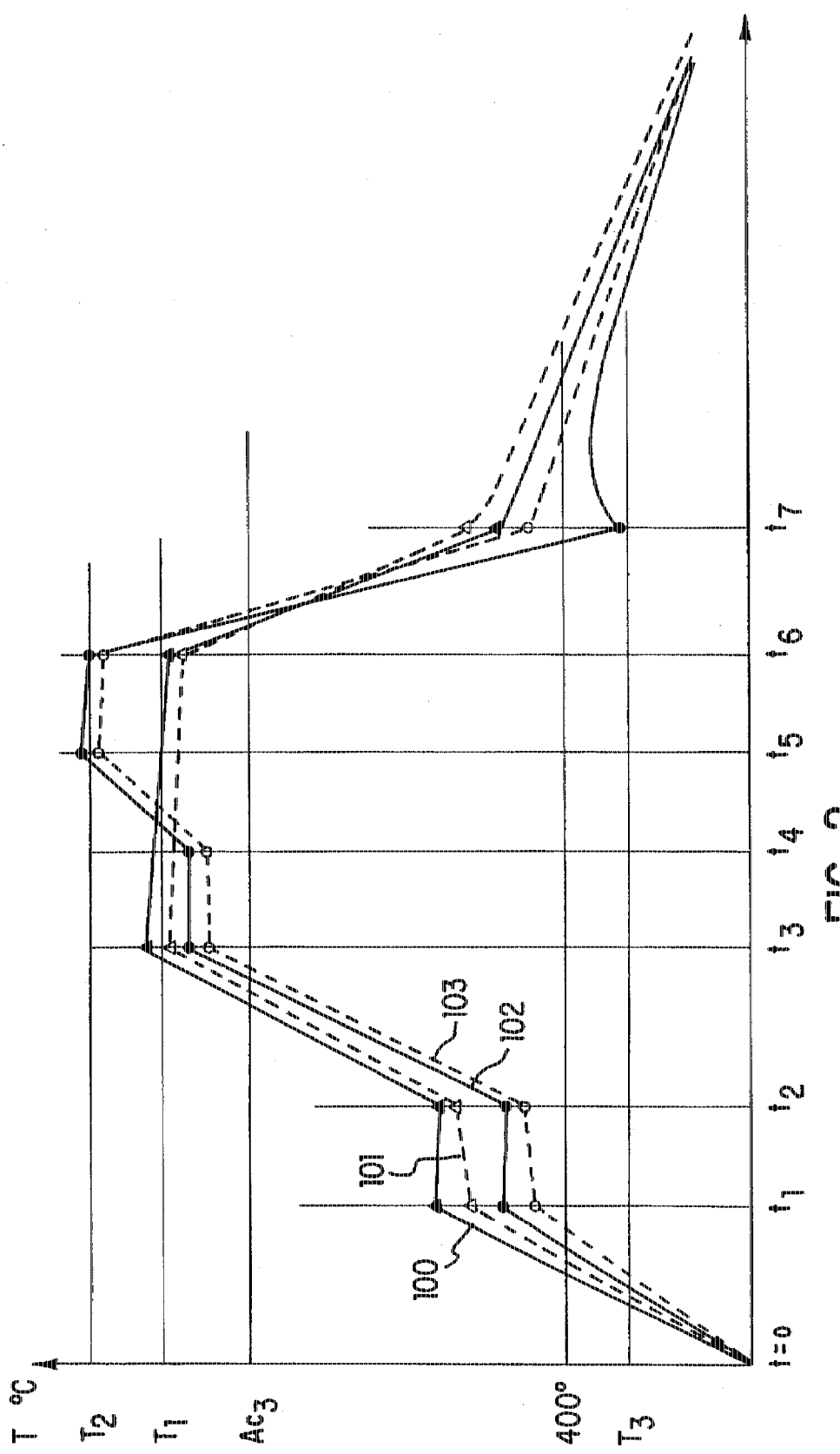
FIG. 2 represents an example of the change in the temperature at various points in the section of the rail, as a function of time, during a heat treatment.

On passing through the heat treatment installation 5, each cross-section of the rail undergoes a thermal cycle of the type represented in FIG. 2, with the time on the abscissa and the temperature on the ordinate, the cross section being useful conceptually and being as thin a slice as one wishes. In this figure, the curve 100 represents the thermal cycle of the skin of the flange and of the web, and the curve 101 represents the thermal cycle of points located at the core of the flange or of the web; the curves 102 and 103 respectively correspond to the skin and core of the head.

Assuming that, at time t=0, an arbitrary cross-section of the rail enters preheating (e.g., the first coil 10 of the preheating means 7), the preferred thermal cycle undergone by the cross-section of the rail throughout the heat treatment can be described as follows:

between t=0 and the time $t_1$ at which the cross-section of the rail leaves the first coil 10, the entire section of the rail is heated and brought to temperatures of several hundreds of degrees, for example 500° C. to 600° C.; the skin is heated faster than the interior of the section and, because of the frequency selected for the electrical supply current of the coils, that part of the cross-section of the rail which corresponds to the web and to the flange is heated faster, and therefore brought to a higher temperature, than that part of the cross-section of the rail which corresponds to the head;

between times $t_1$ and $t_2$, the cross-section of the rail passes through the first equalization zone 11, in which it is not heated so that the skin temperatures fall slightly whereas the core temperatures increase slightly because of the diffusion of heat inside the rail and, in the head as in the web and in the flange, the core temperatures approach the skin temperatures;

between times $t_2$ and $t_3$, the cross-section of the rail passes through, e.g., a second preheating coil 10, which heats it to bring all its points to temperatures greater than the temperature of the end of austenitic heating transformation of the steel of which the rail is made, in order to obtain an austenitic structure throughout the cross-section of the rail; the total preheating lasts several minutes, in general less than 5 min, and, under these conditions, the temperature of the end of austenitic heating transformation is greater by at least 100° C. than the temperature $Ac_3$ of the end of austenitic slow-heating transformation; for the same reasons as before, at time $t_3$ the average temperature of the web and flange is greater than the average temperature of the head;

between times $t_3$ and $t_4$, the cross-section of the rail passes through the second equalization zone 11, and the temperatures equalize, on the one hand in that part of the cross-section of the rail which corresponds to the head, and, on the other hand, in that part of the cross-section of the rail which corresponds to the web and flange; in order to obtain a very homogeneous austenite without needing to heat the rail to too high a temperature, which would coarsen the grain excessively, the total duration of the preheating, that is to say the time which elapses between t=0 and $t_4$, should preferably be greater than 4 min;

between times $t_4$ and $t_5$, the cross-section of the rail passes under, e.g., the head overheating means 8, and that part of the cross-section of the rail which corresponds to the head is heated so that its average temperature reaches $T_2$, that is to say greater by at least 40° C. than the average temperature $T_1$ of that part of the cross-section of the rail which corresponds to the web and flange, but without exceeding 1050° C., and preferably 1000° C., so as not to cause excessive coarsening of the austenitic grain;

between times $t_5$ and $t_6$, the cross-section of the rail passes through an equalization zone then begins cooling (e.g., enters the accelerated cooling means 9) before leaving the latter at time $t_7$; on passing through the accelerated cooling means 9, that part of the cross-section of the rail which corresponds to the head is cooled under conditions defined by the skin temperature $T_3$ at time $t_7$ and by the cooling rate Vr on passing to 700° C. in the skin; that part of the cross-section of the rail which corresponds to the flange and web is cooled less energetically than that part of the cross-section of the rail which corresponds to the head, so that, at the exit of the accelerated cooling means 9, its average temperature is greater than the average temperature of that part of the cross-section of the rail which corresponds to the head;

after time $t_7$, the rail cools naturally in air to ambient temperature; at the exit of the accelerated cooling means 9, since the skin temperature of that part of the cross-section of the rail which corresponds to the head is substantially lower than the core temperature, at the start of the natural air cooling a rise in the skin temperature is observed, resulting from the homogenization of the temperature in the section by diffusion of the internal heat.

The cooling rate Vr, as well as the temperature $T_3$, are chosen so that the structure obtained is the hardest possible fine pearlite without there being traces of bainite or martensite. To this end, the cooling rate Vr should be as high as possible, but without exceeding the rate which makes it possible to obtain a bainitic or martensitic structure, and the temperature $T_3$ should be sufficiently low, but not too low for the pearlitic transformation to be complete. $T_3$ should be less than the temperature of the end of the cooling transformation of the steel of which the rail is made.

The heat treatment may be a complete pearlitic quench, in which case the temperature $T_3$ is ambient temperature; the heat treatment may also be a quasi-isothermal treatment, and in this case the temperature $T_3$ is of the order of several hundreds of degrees. One skilled in the art is capable of providing such quenches.

The desired structure and hardness may be the same for the flange, web and head, and in this case the average cooling rate of that part of the cross-section of the rail which corresponds to the web and flange is close to that of that part of the cross-section of the rail which corresponds to the head. On the other hand, a lesser hardness may be desired for the web and flange than for the head, in which case a lower cooling rate is set for that part of the cross-section of the rail which corresponds to the flange and web than that of that part of the cross-section of the rail which corresponds to the head. Finally, in order to adjust the temperature at the end of accelerated cooling of that part of the cross-section of the rail which corresponds to the web and flange, the cooling time of this part may be reduced by not operating the nozzles arranged facing the web or flange of the rail and located on the exit side of the accelerated cooling device.

The particular conditions of the accelerated cooling should be determined in accordance, in particular, with the particular characteristics of the continuous cooling transformation diagram of the steel of which the rail is made. In practice, and for the steels in question, the skin cooling rate Vr of that part of the cross-section of the rail which corresponds to the head should be less than 10° C./s, and preferably greater than 5° C./s; the average cooling rate of that part of the cross-section of the rail which corresponds to the flange and web should preferably be less than 5° C./s; also preferably, the temperature $T_3$ at which the skin of the part of the cross-section of the rail leaves the accelerated cooling means should be less than 400° C.

The inventors have observed that the rail deforms during the heat treatment, but that, when it is desired to obtain homogeneous hardness through the rail, that is to say when cooling the entire section of the rail at comparable rates, if that part of the cross-section of the rail which corresponds to the head has been overheated by 40° C. to 80° C. with respect to that part of the cross-section of the rail which corresponds to the flange and web, the rail was little deformed after return to ambient temperature, and, after possible slight straightening, the web was subjected to residual stresses promoting the closure of the cracks.

The inventors also observed that, in order to obtain the same result when hardening the head more than the web or flange, the overheating should be more than 80° C., and preferably between 100° C. and 200° C.

In the embodiment described above, the preheating takes place in two stages, but it may take place directly or in more than two stages in the invention.

The flange typically has very thin edges which naturally cool very fast during the homogenization phases. It may thus be expedient to carry out complementary heating of that part of the cross-section of the rail which corresponds to the flange, for example during the additional heating of that part of the cross-section of the rail which corresponds to the head.

The embodiment described is a continuous heat treatment in which the various cross-sections of the rail successively undergo the heat treatment. However, this heat treatment may be carried out by globally preheating the rail, for example in a furnace, then by overheating all of the flange, and finally by cooling all of the rail. In this case, the various cross-sections of the rail are treated simultaneously.

EXAMPLES

By way of a first non-limiting example, a steel rail was fabricated, the chemical composition of which, by weight, was: C=0.78%, Mn=1.04%, Si=0.44%, Cr=0.22%, the remainder being iron and impurities resulting from production. At the end of preheating, which lasted 4 min 30 s, the average temperature of the web and flange was 880° C. At the end of overheating, the average temperature of the head was 985° C. The skin of the flange was cooled at the rate of 9° C./s to 380° C.; the flange and the web were cooled at the rate of 2° C./s. After return to ambient temperature, the rail was subjected to very slight straightening. Throughout the section, the rail had a fine pearlitic structure, the hardness of the head was 377 HBW and the hardness of the web or flange was 340 HBW. The opening of the web, measured by a saw-cut test, was approximately −1.2 mm, whereas for the same rail, treated according to the prior art, the opening of the web was +2.2 mm.

By way of a second example, a steel rail was fabricated, the chemical composition of which, by weight, was: C=0.77%, Mn=0.91%, Si=0.66%, Cr=0.49%, the remainder being iron and impurities resulting from production. At the end of preheating, which lasted 4 min 30 s, the average temperature of the web and flange was 890° C. At the end of overheating, the average temperature of the head was 940° C. The skin of the flange was cooled at the rate of 7° C./s to 350° C.; the flange and the web were cooled at the rate of 6° C./s. After return to ambient temperature, the rail was subjected to very slight straightening. Throughout the section, the rail had a fine pearlitic structure, the hardness of the head, web and flange was 390 HBW. The opening of the web, measured by a saw-cut test, was approximately −0.9 mm, whereas for the same rail, treated according to the prior art, the opening of the web was +2.4 mm.

French Patent Application 95-10986 filed Sep. 20, 1995, is incorporated herein by reference.

What is claimed as new and desired to be secured by letter patent of the United States is:

1. A process for heat treatment of a steel rail comprising a head, a web and a flange comprising the steps of:
    preheating each cross-section of the rail successively or simultaneously to a temperature above the end of the metallurgical heating transformation of the steel of which the rail is made such that simultaneously or successively the steel in each cross-section of the rail uniformly has a homogeneous austenitic structure;
    overheating that part of each cross-section of the rail which corresponds to the head, successively or simultaneously, so that the average temperature of said head part of each cross-section of the rail is greater by at least 40° C. than the average temperature of that part of the same cross-section of the rail which corresponds to the flange, but without exceeding 1050° C.;
    cooling each cross-section of the rail, successively or simultaneously below the temperature of the end of the cooling transformation of the steel of which the rail is made, so as to obtain a fine pearlitic structure throughout the cross-section of the rail; and
    optionally causing each cross-section of the rail to cool, simultaneously or successively, to ambient temperature.

2. The process as claimed in claim 1, wherein, at the end of preheating, the temperature is greater than Ac3+100° C. at each point in each cross-section of the rail, Ac3 being the slow-rate heating transformation temperature of the steel of which the rail is made.

3. The process as claimed in claim 1 wherein, at the end of overheating, the average temperature of that part of each cross-section of the rail which corresponds to the head is greater by at least 80° C. than the average temperature of that part of the same cross-section which corresponds to the flange.

4. The process as claimed in claim 1, wherein the preheating of each cross-section of the rail lasts at least 4 minutes.

5. The process as claimed in claim 4, wherein the preheating includes an alternate succession of partial and homogenization preheatings, so as to obtain, at the end of preheating, the most homogeneous possible temperature distribution in each cross-section of the rail.

6. The process as claimed in claim 1 wherein, during cooling, a skin cooling rate of the rail on cooling to a temperature of 700° C. is less than 10° C./s.

7. The process as claimed in claim 6, wherein the skin cooling rate of the web and of the flange of the rail on passing to the temperature of 700° C. is less than 5° C./s.

8. The process as claimed in claim 6, wherein at the end of cooling, a skin temperature of the head of the rail is less than or equal to 400° C.

9. The process as claimed in claim 1, wherein the heat treatment of the rail is carried out continuously by passing the rail successively through a preheating means, an overheating means and a cooling means.

10. The process as claimed in claim 9, wherein the preheating means is an induction heater operating at a frequency greater than or equal to 2000 hertz.

11. The process as claimed in claim 10, wherein the preheating means includes a plurality of heating zones separated by equalization zones.

12. The process as claimed in claim 9, wherein the overheating means is an induction heater operating at a frequency greater than or equal to 1000 hertz.

13. The process as claimed in claim 9, wherein the cooling means comprise at least two pipes parallel to the rail which are equipped with a plurality of nozzles capable of blowing air or a mist on the rail, it being possible for the nozzles to be controlled independently of one another, in groups or all together.

* * * * *